United States Patent
Collins

[11] 3,821,388
[45] June 28, 1974

[54] ANIMAL FEED AND PROCESS
[75] Inventor: Robert J. Collins, Portage, Mich.
[73] Assignee: The Upjohn Company, Kalamazoo, Mich.
[22] Filed: Aug. 9, 1971
[21] Appl. No.: 170,323

[52] U.S. Cl. .............................................. 424/269
[51] Int. Cl. ............................................. A61k 27/00
[58] Field of Search ............................ 424/251, 269

[56] References Cited
UNITED STATES PATENTS
3,703,525   11/1972   Tawada et al................... 260/308 R FOREIGN PATENTS OR APPLICATIONS
6,916,543   5/1970   Netherlands....................... 424/269
2,012,190   9/1970   Germany ........................... 260/380

OTHER PUBLICATIONS
Archer et al., Chem. Reviews, Vol. 68, pp. 754, 759–760, (1968).

Primary Examiner—Albert T. Meyers
Assistant Examiner—Frederick E. Waddell
Attorney, Agent, or Firm—John J. Killinger; Roman Saliwanchik

[57] ABSTRACT

An animal feed for increasing meat, milk, or egg production comprising a compound of the group consisting of a 1-substituted 6-phenyl-4H-s-triazolo[4,3-a]-[1,4]benzodiazepine of the formula:

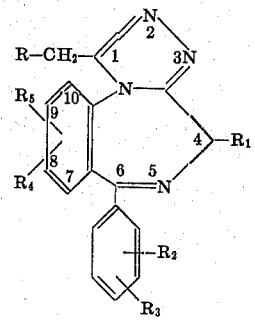

Formula 1 wherein R is selected from the group consisting of cyano, nitro, dialkylamino in which alkyl is of 1 to 3 carbon atoms, inclusive, alkoxy in which the alkyl moiety is defined as above, -COOR″ in which R″ is alkyl defined as above; wherein $R_1$ is selected from the group consisting of hydrogen and alkyl of 1 to 3 carbon atoms, inclusive; and wherein $R_2$, $R_3$, $R_4$, and $R_5$ are selected from the group consisting of hydrogen, alkyl of 1 to 3 carbon atoms, inclusive, halogen, nitro, cyano, trifluoromethyl, alkoxy, alkylthio, alkylsulfinyl, alkylsulfonyl, alkanoyl-amino and dialkylamino in which the carbon chain moieties are of 1 to 3 carbon atoms, inclusive, a pharmacologically acceptable acid addition salt thereof and the N-5 oxide thereof in combination with the nutrient feed.

6 Claims, No Drawings

ANIMAL FEED AND PROCESS

CROSS REFERENCE TO RELATED APPLICATIONS

This application is related to copending U.S. application Ser. No. 138,278, filed Apr. 28, 1971, now abandoned which discloses compounds of the Formula 1 and methods for their preparation.

BRIEF SUMMARY OF THE INVENTION

Broadly the present invention encompasses a nutritionally adequate animal feed having dispersed therein a compound of the Formula 1 in sufficient concentration to provide increasing productivity and feed efficiencies in healthy meat-producing, milk-producing or egg-laying animals. The invention also includes the process of feeding the composition to meat-producing, milk-producing or egg-laying animals.

DETAILED DESCRIPTION

It has been found in recent years that meat-producing animals will gain more weight and gain it faster when various classes of compounds such as vitamins, minerals, estrogens, antibiotics, and tranquilizers are added to the diet. Although the presently available compounds are useful, new materials are still being sought that would produce weight gains more rapidly, to a greater extent, more efficiently with respect to feed intake at a lower cost and without undesirable side effects.

It is now possible by use of the present invention to obtain unexpected results in the feeding of meat-producing, milk-producing, or egg-laying animals; that is to say, an increased rate of weight gain, an increased amount of weight gain, an increase in milk production, or increased rate of egg laying, as well as increased feed efficiency, can be obtained by the addition of minute quantities of a compound of the Formula 1 to the animals usual nutrient feed.

Compounds of the Formula 1 can be prepared by methods disclosed in U.S. application Ser. No. 138,278, filed Apr. 28, 1971, now abandoned.

Unless otherwise specified, all percentages are given on a weight-to-weight basis. The pound (lb.) weights given are avoirdupois units.

Feeding of the compositions of the present invention can commence for birds shortly after hatching and in the case of mammals, during the creep-feeding period of suckling animals when they are starting on solid food and, of course, after weaning. Feeding of the compositions is continued throughout the growing period, lactation period, or egg-laying period.

The total concentration of the compound of the Formula 1 in the feed composition is determined with regard to the species of animal, age, weight, and average amount of feed consumed daily. Preferably the compound of the Formula 1 is employed in the finished feed that will supply the animal with a daily intake of from about 0.015 mg. to about 250 mg. per head per day.

The following table illustrates the range of compound of Formula 1 in milligrams daily dose per head per day for representative animals.

| Animal | Range Daily Dose/Head, mg. | Preferred Daily Dose, mg. |
| --- | --- | --- |
| Swine (birth to 8 weeks) | 0.125 – 12.5 | 0.7 |
| Swine (40 to 200 lbs.) | 0.775 – 72.5 | 4.0 |
| Chickens (growing 0–8 weeks) | 0.015 – 1.5 | 0.1 |
| Hens (laying) | 0.03 – 3.0 | 0.15 |
| Turkeys (growing 0–24 weeks) | 0.1 – 5.0 | 0.25 |
| Beef Cattle (fattening) | 2.5 – 250 | 14.0 |
| Calves (0–12 weeks) | 0.3 – 30 | 1.5 |
| Dairy Cattle (lactation) | 2.5 – 250 | 14.0 |
| Lambs (fattening) | 0.19 – 19 | 1.0 |

The foregoing dosage can generally be accomplished by providing from about 75 mg. to about 12,500 mg. of a compound of the Formula 1 per ton of finished feed.

Advantageously a compound of the Formula 1 is supplied in the form of a liquid or solid premix wherein the concentration is 100 – 2,000 times greater than the desired final concentration of the feed. For example, the compound of Formula 1 can be dissolved or suspended in a fluid vehicle such as corn oil, cottonseed oil, molasses, distillers solubles and the like to prepare a fluid premix. Alternatively, a solid premix can be prepared by mixing a compound of the Formula 1 with an edible solid diluent such as sucrose, lactose, starch, corn meal, flour, calcium carbonate, soybean meal and the like.

EXAMPLE 1

A diet for fattening lambs is prepared from the following types and amounts of ingredients:

| | |
| --- | --- |
| Ground ear corn | 82.05% |
| Alfalfa meal | 10.0 % |
| Soybean oil meal 44% | 7.0 % |
| Ground limestone | 0.3 % |
| Salt | 0.6 % |
| Trace mineral mixture[1] | 0.05% |

[1]Contains the following percent of minerals: Mn, 12; Co, 0.08; Fe, 5.0; Cu, 0.4; I, 0.24; Zn, 0.7.

The above feed to be mixed, pelleted and offered to fattening lambs free-choice in conjunction with hay.

To 999 parts of the preceding feed is added 1 part of a premix composition prepared by mixing 0.7 gm. of 8-chloro-6-phenyl-4H-s-triazolo[4,3-a][1,4]benzodiazepine-1-acetonitrile with sufficient corn meal to make 1 pound.

The feeding composition so prepared supplies 0.7 mg. of 8-chloro-6-phenyl-4H-s-triazolo[4,3-a][1,4]benzodiazepine-1-acetonitrile per pound or 1.55 parts per million.

The foregoing composition is usefully fed to lambs for increased rate of weight gain and improved utilization of feed.

EXAMPLE 2

A chicken feed for broilers is prepared from the following types and amounts of ingredients:

| | |
| --- | --- |
| Yellow corn meal | 67.35% |

-Continued

| | |
|---|---|
| Soybean oil meal | 24.00% |
| Menhaden fish meal | 6.00% |
| Steamed bone meal | 1.00% |
| Ground limestone | 1.00% |
| Iodized salt | .34% |
| 25% Choline chloride | .13% |
| Vitamin $B_{12}$ supplement (6 mg./lb.) | .10% |
| Manganese sulfate | .02% |
| Supplemental vitamin mix[1] | .06% |

[1]Consisting of 16.0 gm. Vitamin A supplement (10 units/mg.); 3.6 gm. Vitamin $D_3$ supplement (15,000 units/gm.); 7.1 gm. riboflavin supplement (1 gm. riboflavin per ounce); 500 mg. niacin.

To 999 parts of the preceding feed is added 1 part of a premix composition prepared by mixing 1.0 gm. of 8-chloro-6-phenyl-4H-s-triazolo[4,3-a][1,4]benzodiazepine-1-acetonitrile with sufficient soybean mill feed to make 1 pound.

The feeding composition so prepared supplies 1.0 mg. of 8-chloro-6-phenyl-4H-s-triazolo[4,3-a][1,4]benzodiazepine-1-acetonitrile per pound, or about 2.2 parts per million.

The foregoing composition is usefully fed to chickens for increased rate of weight gain and improved utilization of feed. Similarly the composition can be fed to turkeys, ducks and geese.

EXAMPLE 3

A fattening feed for 800 pound yearling cattle is prepared from the following types and amounts of ingredients:

| | |
|---|---|
| Ground ear corn | 89.75% |
| Soybean oil meal, 44% | 9.0 % |
| Ground limestone | 0.7 % |
| Salt | 0.5 % |
| Trace mineral mixture[1] | 0.05% |

[1]Contains the following percent of minerals: Mn, 12; Co, 0.08; Fe, 5.0; Cu, 0.4; I, 0.24; Zn, 0.7.

To 999 parts of the preceding feed is added 1 part of a premix composition prepared by mixing 1.5 gm. of 8-chloro-6-phenyl-4H-s-triazolo[4,3-a][1,4]benzodiazepine-1-acetonitrile with sufficient wheat flour to make 1 pound.

The feeding composition so prepared supplies 1.5 mg. of 8-chloro-6-phenyl-4H-s-triazolo[4,3-a][1,4]benzodiazepine-1-acetonitrile per pound, or about 3.3 parts per million.

Cattle are to receive the foregoing feed ad libitum together with 5 lb. of hay per head per day and when so fed have an increased rate of weight gain and improved utilization of feed.

EXAMPLE 4

A swine diet for growing hogs of 40 to 100 pounds body weight is prepared from the following types and amounts of ingredients:

| | |
|---|---|
| Corn, ground | 78.15% |
| Soybean oil meal, 44% | 17.0 % |
| Meat and bone scraps, 50% | 3.0 % |
| Oyster shell flour | 0.4 % |
| Bone meal | 0.5 % |
| Salt | 0.5 % |
| Trace mineral mixture[1] | 0.05% |
| Zinc oxide | 0.01% |
| Vitamin A and D supplement[2] | 0.25% |
| B Vitamin supplement[3] | 0.05% |
| Vitamin $B_{12}$ supplement[4] | 0.09% |

[1]Contains the following percent of minerals: Mn, 12; Co, 0.08; Fe, 5.0; Cu, 0.4; I, 0.24; Zn, 0.7.
[2]Contains 300 USP units $D_3$/Gm. and 1500 I.U.A./Gm.

-Continued

[3]Contains per lb.: riboflavin, 2000 mg.; calcium pantothenate, 4000 mg.; niacin; 9000 mg.; and choline chloride 10,000 mg.
[4]Contains 6 mg. Vitamin $B_{12}$ per lb.

To 999 parts of the preceding feed is added 1 part of a premix composition prepared by mixing 0.75 gm. of 8-chloro-6-phenyl-4H-s-triazolo[4,3-a][1,4]benzodiazepine-1-acetonitrile with sufficient ground limestone to make one pound.

The feeding composition so prepared supplies 0.75 mg. of 8-chloro-6-phenyl-4H-s-triazolo[4,3-a][1,4]benzodiazepine-1-acetonitrile per pound, or about 1.65 parts per million.

The foregoing composition is usefully fed to hogs for increased rate of weight gain and improved utilization of feed.

EXAMPLE 5

Following the procedure of the preceding Examples 1 to 4, inclusive, animal feeds are similarly prepared substituting equimolar amounts of:

8-chloro-1-(ethoxymethyl)-6-phenyl-4H-s-triazolo[4,3-a]-[1,4]benzodiazepine;

8-chloro-6-phenyl-4H-s-triazolo[4,3-a][1,4]benzodiazepine-1-acetic acid methyl ester;

8-chloro-1-[diethylaminomethyl]-6-phenyl-4H-s-triazolo-[4,3-a][1,4]benzodiazepine;

8-nitro-1-(diethylaminomethyl)-6-phenyl-4H-s-triazolo-[4,3-a][1,4]benzodiazepine;

9-ethylthio-1-(propoxymethyl)-6-(o-chlorophenyl)-4H-s-triazolo[4,3-a][1,4]benzodiazepine;

7-fluoro-1-(methoxymethyl)-6-(o-bromophenyl)-4H-s-triazolo[4,3-a][1,4]benzodiazepine;

7-trifluoromethyl-6-[m-(methylsulfonyl)phenyl]-4H-s-triazolo[4,3-a][1,4]benzodiazepine-1-acetonitrile;

9-iodo-1-(methoxymethyl)-6-(2,6-difluorophenyl)-4H-s-triazolo[4,3-a][1,4]benzodiazepine;

7-ethylsulfinyl-1-(isopropoxymethyl)-6-[p-(trifluoromethyl)phenyl]-4H-s-triazolo[4,3-a][1,4]benzodiazepine;

9-methyl-1-(dipropylaminomethyl)-6-(p-isopropylphenyl)-4H-s-triazolo[4,3-a][1,4]benzodiazepine;

7,9-diethyl-6-(2,4-diethylphenyl)-4H-s-triazolo[4,3-a]-[1,4]benzodiazepine-1-acetonitrile; 7,8-dinitro-6-(2,4-dibromophenyl)-4H-s-triazolo[4,3-a]-[1,4]benzodiazepine-1-acetonitrile;

7-trifluoromethyl-6-[m-(methylsulfonyl)phenyl]-4H-s-triazolo[4,3-a][1,4]benzodiazepine-1-acetic acid ethyl ester;

7,9-diethyl-6-(2,4-diethylphenyl)-4H-s-triazolo[4,3-a]-[1,4]benzodiazepine-1-acetic acid propyl ester;

7,8-dinitro-6-(2,4-dibromophenyl)-4H-s-triazolo[4,3-a]-[1,4]benzodiazepine-1-acetic acid methyl ester;

8-chloro-1-(methylthio)methyl-6-(o-chlorophenyl)-4H-s-triazolo[4,3-a][1,4]benzodiazepine;

9-nitro-1-(ethylthio)methyl-6-[m-(propylsulfonyl)-phenyl]-4H-s- triazolo[4,3-a][1,4]benzodiazepine;

10-chloro-1-(methylthio)methyl-6-(m-isopropylphenyl)-4H-s-triazolo[4,3-a][1,4]benzodiazepine;

9-(dipropylamino)-1-(dimethylamino)methyl-6-[p-(propionylamino)phenyl]-4H-s-triazolo[4,3-a][1,4]benzodiazepine;

8-(methylsulfinyl)-1-(diethylamino)methyl-6-(o-nitrophenyl)-4H-s-triazolo[4,3-a][1,4]benzodiazepine;

7-(ethylsulfonyl)-1-(dipropylamino)methyl-6-(o-cyanophenyl)-4H-s-triazolo[4,3-a][1,4]benzodiazepine;

4-propyl-1-(diisopropylamino)methyl-6-[m-(methylthio)-phenyl]-4H-s-triazolo[4,3-a][1,4]benzodiazepine;

10-fluoro-7-chloro-1-ethoxymethyl-6-[p-(trifluoromethyl)phenyl]-4H-s-triazolo[4,3-a][1,4]benzodiazepine;

7,9-diethoxy-1-methoxymethyl-6-(m-ethoxyphenyl)-4H-s-triazolo[4,3-a][1,4]benzodiazepine;

7-(propylthio)-6-(m-iodophenyl)-4H-s-triazolo[4,3-a]-[1,4] enzodiazepine-1-acetonitrile;

8-(acetylamino)-6-(p-iodophenyl)-4H-s-triazolo[4,3-a]-[1,4]benzodiazepine-1-acetonitrile;

4-propyl-1-nitromethyl-6-(o-iodophenyl)-4H-s-triazolo-[4,3-a][1,4]benzodiazepine;

4-ethyl-1-(methylthio)methyl-6-[o-ethylthio)phenyl]-4H-s-triazolo[4,3-a][1,4]benzodiazepine;

4-methyl-7,10-dichloro-1-(ethylthio)methyl-6-(m-isopropoxyphenyl)-4H-s-triazolo[4,3-a][1,4]benzodiazepine;

9-(propionylamino)---(propylthio)methyl-6-[m-(propylthio)phenyl]-4H-s-triazolo[4,3-a][1,4]benzodiazepine;

7-(diisopropylamino)-1-nitromethyl-6-[p-(dipropylamino)-phenyl]-4H-s-triazolo[4,3-a][1,4]benzodiazepine;

4-isopropyl-7,9-diiodo-6-phenyl-4H-s-triazolo[4,3-a]-[1,4]benzodiazepine-1-acetic acid ethyl ester;

8-chloro-6-(3,4-dimethylphenyl)-4H-s-triazolo[4,3-a]-[1,4]benzodiazepine-1-acetic propyl ester;

6-(2-methyl-4-methoxyphenyl)-4H-s-triazolo[4,3-a]-[1,4]benzodiazepine-1-acetonitrile;

8-methylthio-1-isopropoxymethyl-6-phenyl-4H-s-triazolo-[4,3-a][1,4]benzodiazepine;

4,8-dimethoxy-1-ethoxymethyl-6-phenyl-4H-s-triazolo-[4,3-a][1,4]benzodiazepine for the 8-chloro-6-phenyl-4H-s-triazolo[4,3-a][1,4]benzodiazepine-1-acetonitrile of the examples.

I claim:

1. A process for increasing meat, milk, or egg production in a healthy meat-producing, milk-producing, or egg-laying animal comprising the feeding thereto of from about 0.015 to about 250 mg./day of a compound selected from the group consisting of a 1-substituted-6-phenyl-4H-s-triazolo[4,3-a][1,4]benzodiazepine of the formula:

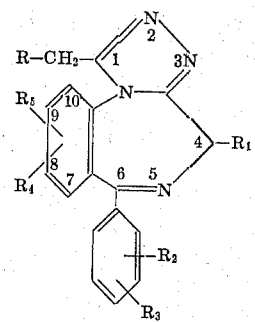

wherein R is selected from the group consisting of cyano, nitro, dialkylamino in which alkyl is of 1 to 3 carbon atoms, inclusive, alkoxy in which the alkyl moiety is defined as above, alkylthio in which the alkyl moiety is defined as above, -COOR'' in which R'' is alkyl defined as above; wherein $R_1$ is selected from the group consisting of hydrogen and alkyl of 1 to 3 carbon atoms, inclusive; and wherein $R_2$, $R_3$, $R_4$, and $R_5$ are selected from the group consisting of hydrogen, alkyl of 1 to 3 carbon atoms, inclusive, halogen, nitro, cyano, trifluoromethyl, alkoxy, alkylthio, alkylsulfinyl, alkylsulfonyl, alkanoylamino and dialkylamino in which the carbon chain moieties are of 1 to 3 carbon atoms, inclusive; and a pharmacologically acceptable acid addition salt thereof in combination with the nutrient animal feed.

2. The process of claim 1 wherein the member selected is in a concentration of from 125 mg. to 12,500 mg. per pound of nutrient carrier in the form of a premix.

3. The process of claim 1 wherein the member selected is in the concentration from 250 mg. to 25,000 mg. per ton of feed.

4. The process of claim 1 wherein the compound is 8-chloro-6-phenyl-4H-s-triazolo[4,3-a]-[1,4]benzodiazepine-1-acetonitrile.

5. The process of claim 2 wherein the compound is 8-chloro-6-phenyl-4H-s-triazolo[4,3-a]-[1,4]benzodiazepine-1-acetonitrile.

6. The process of claim 3 wherein the compound is 8-chloro-6-phenyl-4H-s-triazolo[4,3-a]-[1,4]benzodiazepine-1-acetonitrile.

* * * * *